US009634895B2

(12) United States Patent
Folco et al.

(10) Patent No.: US 9,634,895 B2
(45) Date of Patent: *Apr. 25, 2017

(54) OPERATING A DUAL CHIPSET NETWORK INTERFACE CONTROLLER ('NIC') THAT INCLUDES A HIGH PERFORMANCE MEDIA ACCESS CONTROL CHIPSET AND A LOW PERFORMANCE MEDIA ACCESS CONTROL CHIPSET

(71) Applicant: International Business Machines Corporation, Armonk, NY (US)

(72) Inventors: Rafael C. Folco, Santa Bárbara D'oeste (BR); Breno H. Leitão, Campinas (BR); Tiago N. Santos, Araraquara (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,576

(22) Filed: Aug. 25, 2015

(65) Prior Publication Data

US 2015/0365286 A1 Dec. 17, 2015

Related U.S. Application Data

(63) Continuation of application No. 14/096,270, filed on Dec. 4, 2013.

(51) Int. Cl.
*G06F 15/16* (2006.01)
*H04L 12/24* (2006.01)
(Continued)

(52) U.S. Cl.
CPC ........ *H04L 41/0816* (2013.01); *G06F 9/5094* (2013.01); *G06F 15/161* (2013.01);
(Continued)

(58) Field of Classification Search
CPC ............ H04L 41/0816; H04L 43/0888; G06F 15/161; G06F 12/0806; G06F 1/3293
(Continued)

(56) References Cited

U.S. PATENT DOCUMENTS 7,162,270 B2   1/2007 Chen
7,774,440 B1 * 8/2010 Bagrodia ............ H04L 41/0816
                                                    703/1

(Continued)

FOREIGN PATENT DOCUMENTS

WO   WO 2011/026084 A1   3/2011

OTHER PUBLICATIONS

Xie et al., "Three-Dimensional Network-on-Chip Architecture", Book Title, "Three Dimensional Integrated Circuit Design", (Month Unknown) 2010, pp. 189-217, Springer Science + Business Media, LLC 2010, USA, DOI: 10.1007/978-1-4419-0784-4_8.

(Continued)

*Primary Examiner* — Joseph E Avellino
*Assistant Examiner* — Binod J Kunwar
(74) *Attorney, Agent, or Firm* — Brandon C. Kennedy; Robert R. Williams; Kennedy Lenart Spraggins LLP (57) ABSTRACT

Operating a dual chipset network interface controller ('NIC') that includes a high performance media access control chipset and a low performance media access control chipset, including: determining, by a NIC control module, an amount of network traffic being processed by the NIC; determining, by the NIC control module, whether the amount of network traffic being processed by the NIC exceeds a predetermined threshold; responsive to determining that the amount of network traffic being processed by the NIC exceeds a predetermined threshold, configuring, by the NIC control module, the NIC to utilize the high performance media access control chipset for data communications (Continued)

operations; and responsive to determining that the amount of network traffic being processed by the NIC does not exceed the predetermined threshold, configuring, by the NIC control module, the NIC to utilize the low performance media access control chipset for data communications operations.

7 Claims, 4 Drawing Sheets (51) Int. Cl.
  *H04L 12/26* (2006.01)
  *G06F 9/50* (2006.01)
  *G06F 1/32* (2006.01)
(52) U.S. Cl.
  CPC ........ *H04L 43/0888* (2013.01); *G06F 1/3293* (2013.01); *G06F 2209/5022* (2013.01)
(58) Field of Classification Search
  USPC ................................................ 709/250, 224
  See application file for complete search history.

(56) References Cited

U.S. PATENT DOCUMENTS

| | | | | |
|---|---|---|---|---|
| 7,783,810 | B2* | 8/2010 | Kyusojin | G06F 13/24 709/250 |
| 7,860,943 | B2* | 12/2010 | Kim | H04L 12/2803 709/217 |
| 8,171,175 | B2* | 5/2012 | Cheng | H04L 5/0007 709/250 |
| 8,174,975 | B2* | 5/2012 | Lindsay | H04L 1/1671 370/230 |
| 8,190,298 | B2 | 5/2012 | Roh et al. | |
| 8,286,014 | B2 | 10/2012 | Han et al. | |
| 8,364,857 | B2* | 1/2013 | Pyers | G06F 1/3203 455/556.2 |
| 8,612,611 | B2* | 12/2013 | Morimoto | H04L 49/90 709/228 |
| 8,943,343 | B2* | 1/2015 | Boom | G06F 1/32 713/320 |
| 9,178,815 | B2* | 11/2015 | Gasparakis | H04L 45/74 |
| 2002/0188749 | A1* | 12/2002 | Gaur | G06F 13/128 709/234 |
| 2004/0266493 | A1* | 12/2004 | Bahl | H04W 52/0277 455/574 |
| 2006/0002297 | A1* | 1/2006 | Sand | H04L 12/5695 370/235 |
| 2007/0079150 | A1* | 4/2007 | Belmont | G06F 1/3228 713/300 |
| 2007/0094444 | A1* | 4/2007 | Sutardja | G06F 1/3203 711/112 |
| 2008/0057896 | A1 | 3/2008 | Kim et al. | |
| 2008/0120426 | A1* | 5/2008 | Balakrishnan | H04L 69/163 709/230 |
| 2009/0216829 | A1* | 8/2009 | Terasaki | H04L 45/60 709/201 |
| 2010/0284404 | A1* | 11/2010 | Gopinath | G06F 9/5005 370/392 |
| 2011/0004877 | A1* | 1/2011 | Wu | G06F 9/455 718/1 |
| 2011/0239273 | A1* | 9/2011 | Yang | G06F 21/577 726/3 |
| 2011/0261698 | A1* | 10/2011 | Kamerkar | H04L 12/2697 370/235 |
| 2011/0296149 | A1* | 12/2011 | Carter | G06F 1/3203 712/229 |
| 2012/0155482 | A1 | 6/2012 | Chang et al. | |
| 2014/0254594 | A1* | 9/2014 | Gasparakis | H04L 45/74 370/392 |
| 2014/0269299 | A1* | 9/2014 | Koornstra | H04L 41/0816 370/235 |
| 2014/0298060 | A1* | 10/2014 | Hooker | G06F 1/3293 713/323 |
| 2015/0146740 | A1* | 5/2015 | Yasuda | H04L 49/00 370/419 |

OTHER PUBLICATIONS

NVIDA, Whitepaper, "NVIDIA's Next Generation Notebook Technology: Optimus", nvidia.com (online), accessed May 20, 2013, 24 pages, URL: www.nvidia.com/object/LO_optimus_whitepapers.html.

Shang et al., "Dynamic Voltage Scaling with Links for Power Optimization of Interconnection Networks", Proceedings, The Ninth International Symposium on High-Performance Computer Architecture (HPCA-9 2003) Feb. 2003, pp. 91-102, IEEE Xplore Digital Library, DOI: 10.1109/HPCA.2003.1183527.

Wikipedia, "Network on Chip," Wikipedia.org (online), accessed May 20, 2013, 2 pages, URL: en.wikipedia.org/wiki/Network_On_Chip.

Vukovic, "Communication Network Power Efficiency Assessment, Limitations and Directions", ElectronicsCOOLING.com (online), Issue: Aug. 2004, accessed May 20, 2013, 4 pages, URL: www.electronics-cooling.com/2004/08/communication-network-power-efficiency-assessment-limitations-and-directions/.

Arm, "The Architecture for the Digital World", arm.com (online), accessed May 20, 2013, 5 pages, URL: www.arm.com/products/processors/technologies/bigLITTLEprocessing.php.

Sohan et al., "Characterizing 10 Gbps Network Interface Energy Consumption", 2010 IEEE 35th Conference on Local Computer Networks (LCN 2010), Oct. 2010, pp. 268-71, IEEE Xplore Digital Library, DOI: 10.1109/LCN.2010.5735719.

Kornaros, "Multi-Core Embedded Systems", Month: Unknown, Year: 2010, 23 pages, CRC Press, Taylor & Francis Group, Boca Raton, FL. ISBN: 978-1-4398-1161-0.

Gebali et al., "Networks-on-Chips: Theory and Practice", Mar. 25, 2009, 38 pages, CRC Press, Taylor & Francis Group, Boca Raton, FL. ISBN-10: 1420079786.

* cited by examiner

OPERATING A DUAL CHIPSET NETWORK INTERFACE CONTROLLER ('NIC') THAT INCLUDES A HIGH PERFORMANCE MEDIA ACCESS CONTROL CHIPSET AND A LOW PERFORMANCE MEDIA ACCESS CONTROL CHIPSET

CROSS-REFERENCE TO RELATED APPLICATION

This application is a continuation application of and claims priority from U.S. patent application Ser. No. 14/096,270, filed on Dec. 4, 2013.

BACKGROUND OF THE INVENTION

Field of the Invention

The field of the invention is data processing, or, more specifically, methods, apparatus, and products for operating a dual chipset NIC that includes a high performance media access control chipset and a low performance media access control chipset.

Description of Related Art

Modern computing systems utilize communications adapters, in the form of an expansion card or an on-board adapter, to communicate with other computers via a data communications network. Such communications adapters may be capable of sending and receiving data at extremely high rates. Such communications adapters can also consume significant amounts of power to support high data exchange rates, even when the communications adapters are sending and receiving data at rates that are well below their capabilities.

SUMMARY OF THE INVENTION

Operating a dual chipset NIC that includes a high performance media access control chipset and a low performance media access control chipset, including: determining, by a NIC control module, an amount of network traffic being processed by the NIC; determining, by the NIC control module, whether the amount of network traffic being processed by the NIC exceeds a predetermined threshold; responsive to determining that the amount of network traffic being processed by the NIC exceeds a predetermined threshold, configuring, by the NIC control module, the NIC to utilize the high performance media access control chipset for data communications operations; and responsive to determining that the amount of network traffic being processed by the NIC does not exceed the predetermined threshold, configuring, by the NIC control module, the NIC to utilize the low performance media access control chipset for data communications operations.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
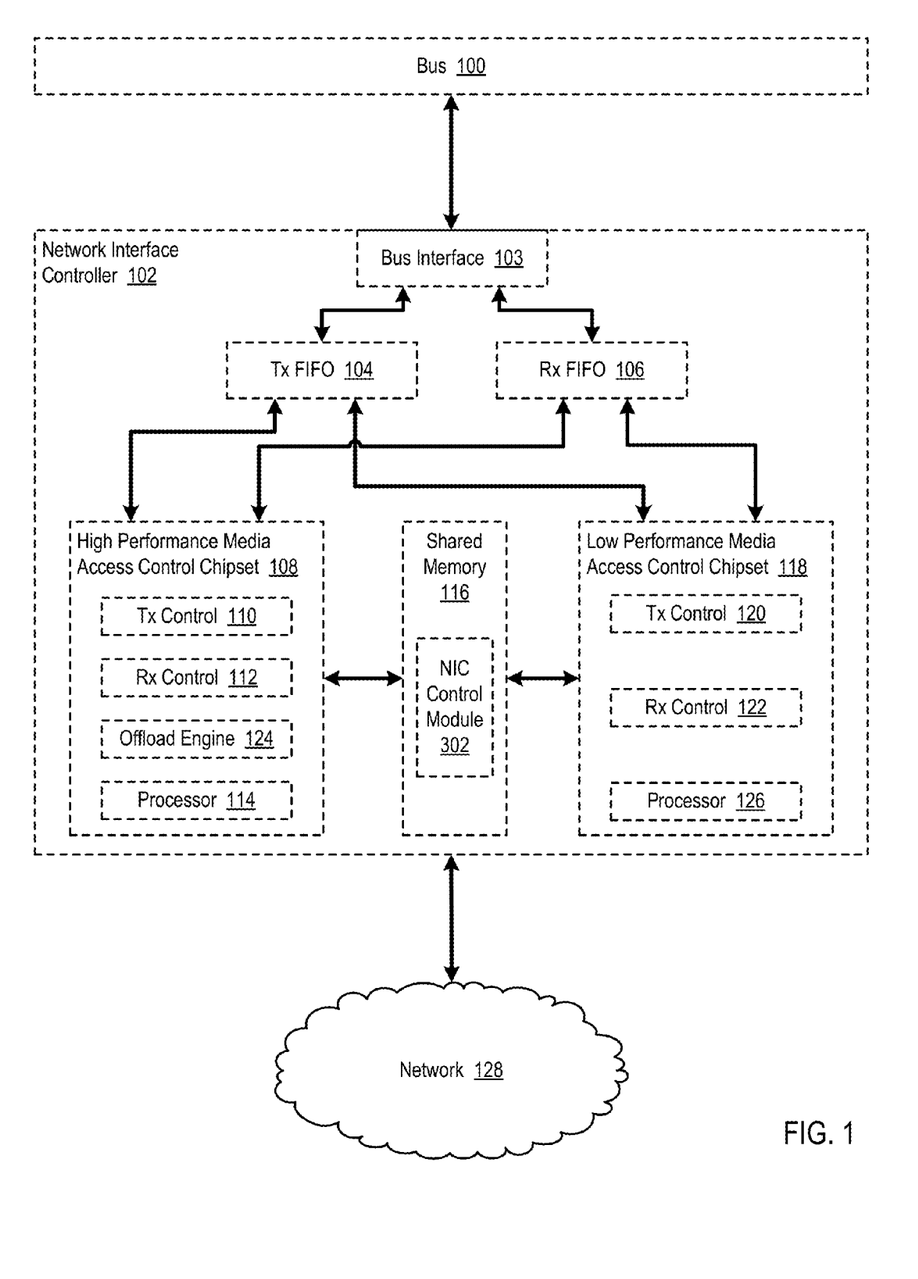
FIG. 1 sets forth a block diagram of a dual chipset NIC according to embodiments of the present invention.

Example methods, apparatuses, and products for operating a dual chipset NIC that includes a high performance media access control chipset and a low performance media access control chipset in accordance with the present invention are described with reference to the accompanying drawings, beginning with FIG. 1. FIG. 1 sets forth a block diagram of a dual chipset NIC (102) according to embodiments of the present invention. The NIC (102) of FIG. 1 represents a computer hardware component that connects a computer to a computer network. The NIC (102) of FIG. 1 may reside within a personal computer, a blade server in a data center, a standalone server, or in other computing systems. The NIC (102) of FIG. 1 may be embodied as an expansion card that is coupled for data communications with a computer bus (100) via a bus interface (103). Alternatively, the NIC (102) may be built into a motherboard of a computer and coupled for data communications with a computer bus (100) that also resides on the motherboard. In the example of FIG. 1, the NIC (102) may implemented to enable a computer to communicate with a computer network (128) over many different data communications protocols, such that the NIC (102) may be embodied as an Ethernet adapter, a Fibre Channel adapter, a Fibre Channel over Ethernet adapter, and so on.

The NIC (102) of FIG. 1 includes a Transfer ('Tx') FIFO (104) and a Receive ('Rx') FIFO (106). In the example of FIG. 1, the Tx FIFO (104) may include computer memory for storing packets to be transferred from the NIC (102) via the bus interface (103) and bus (100) to other components within a computing system, such as a computer processor. In the example of FIG. 1, the Rx FIFO (106) may include computer memory for storing packets received by the NIC (102) from other components within a computing system, such as a computer processor, via the bus interface (103) and bus (100). In such a way the Tx FIFO (104) and Rx FIFO (106) may be used to store data packets being received and transferred by the NIC (102).

The NIC (102) of FIG. 1 includes both a high performance media access control chipset (108) and a low performance media access control chipset (118). In the example of FIG. 1, the high performance media access control chipset (108) and the low performance media access control chipset (118) may be embodied as automated computing machinery, including processing units, circuits, computer memory, and similar computing components configured to perform functions that enable the NIC (102) to carry out data communications with a data communications network (128) over a Media Independent Interface ('MII').

In the example of FIG. 1, the high performance media access control chipset (108) includes a Tx Control (110) module and an Rx Control (112) module. The Tx Control (110) module may be embodied, for example, as a circuit configured to load messages and data into the Tx FIFO (104)

to be transferred from the NIC (102) via the bus interface (103) and bus (100) to other components within a computing system, such as a computer processor. The Rx Control (112) module may be embodied, for example, as a circuit configured to retrieve and process messages and data from Rx FIFO (106) for subsequent transfer by the NIC (102) to the data communications network (128). In the example of FIG. 1, the low performance media access control chipset (118) includes a similar Tx Control (120) module and an Rx Control (122) module.

In the example of FIG. 1, the high performance media access control chipset (108) and the low performance media access control chipset (118) also include a processor (114, 126). In the example of FIG. 1, each processor (114, 126) represents computing machinery for processing computer program instructions. In the example of FIG. 1, the processor (114) in the high performance media access control chipset (108) may operate at a higher clock rate than the processor (126) in the low performance media access control chipset (118), such that the processor (114) in the high performance media access control chipset (108) can execute computer program instructions at a faster rate than the processor (126) in the low performance media access control chipset (118). In such a way, the high performance media access control chipset (108) may provide greater performance than the low performance media access control chipset (118).

The high performance media access control chipset (108) includes an offload engine (124). In the example of FIG. 1, the offload engine (124) may be embodied as automated computing machinery, such as a digital circuit, for processing of an entire protocol stack such that such processing is 'offloaded' from computer processors in a computing system that includes the NIC (102) to the actual NIC (102) itself. For example, the offload engine (124) of FIG. 1 may process the entire TCP/IP stack when the NIC (102) is embodied as an Ethernet adapter. The offload engine (124) may therefore be responsible for carrying out certain functions such as connection establishment using a 3-way handshake, acknowledgment of received packets, checksum and sequence number calculations, and so on. In such a way, moving some or all of these functions to dedicated hardware such as the offload engine (124) can free a computing system's primary CPU to perform other tasks.

Readers will appreciate that the low performance media access control chipset (118) does not include an offload engine. Because the offload engine (124) of the high performance media access control chipset (108) represents additional power consuming computer hardware, the low performance media access control chipset (118) may be utilized during periods of low network bandwidth to reduce the amount of power utilized by the NIC (102). Furthermore, the presence of the offload engine (124) in the high performance media access control chipset (108) may result in improved performance by the high performance media access control chipset (108) relative to the low performance media access control chipset (118).

In the example of FIG. 1, the NIC (102) also includes shared memory (116) that is accessible by the high performance media access control chipset (108) and the low performance media access control chipset (118). The shared memory (116) of FIG. 1 can include, stored within the shared memory (116), control logic for managing the operation of the NIC (102), such as a NIC control module (302). The NIC control module (302) of FIG. 1 may be embodied, for example, as a module of computer program instructions executing on computer hardware such as a computer processor.

The NIC control module (302) of FIG. 1 may include computer program instructions that, when executed, determine an amount of network traffic being processed by the NIC (102). In the example of FIG. 1, determining the amount of network traffic being processed by the NIC (102) can include determining the amount of network traffic being processed by the NIC (102) over a predetermined period time. In the example of FIG. 1, the amount of network traffic being processed by the NIC (102) may be expressed, for example, in terms of the number of bytes processed by the NIC (102) over a particular unit of time. The amount of network traffic being processed by the NIC (102) can include the number of bytes of data received by the NIC (102), the number of bytes of data transferred by the NIC (102), or any combination thereof. In such a way, the amount network traffic being processed by the NIC (102) can represent the total amount of data flowing through the NIC (102) over a particular period of time. Determining an amount of network traffic being processed by the NIC (102) may be carried out, for example, by monitoring the amount of data flowing out of an egress port of the NIC (102) over a predetermined period of time, by monitoring the amount of data flowing into an ingress port of the NIC (102) over a predetermined period of time, or any combination thereof.

The NIC control module (302) of FIG. 1 may also include computer program instructions that, when executed, determine whether the amount of network traffic being processed by the NIC (102) exceeds a predetermined threshold. In the example of FIG. 1, the predetermined threshold represents a point at which the media access control chipset that is best equipped to handle the amount of network traffic that is being processed by the NIC (102) changes. For example, when the amount of network traffic that is being processed by the NIC (102) is lower than the predetermined threshold, data communications operations should be carried out using the low performance media access control chipset (118). Alternatively, when the amount of network traffic that is being processed by the NIC (102) is greater than the predetermined threshold, data communications operations should be carried out using the high performance media access control chipset (108). As such, the predetermined threshold may be set to a value representing the maximum amount of network traffic that can be processed by the NIC (102) using the low performance media access control chipset (118). Determining whether the amount of network traffic being processed by the NIC (102) exceeds a predetermined threshold may therefore be carried out by comparing the amount of network traffic being processed by the NIC (102) to the predetermined threshold.

The NIC control module (302) of FIG. 1 may also include computer program instructions that, when executed, configures the NIC (102) to utilize the high performance media access control chipset (108) for data communications operations. Configuring the NIC (102) to utilize the high performance media access control chipset (108) for data communications operations can include powering down the low performance media access control chipset (118). Configuring the NIC (102) to utilize the high performance media access control chipset (108) for data communications operations is carried out in response to affirmatively determining that the amount of network traffic being processed by the NIC (102) exceeds the predetermined threshold.

Configuring the NIC (102) to utilize the high performance media access control chipset (108) for data communications operations may be carried out, for example, through the use of an active flag maintained by each media access control chipset in shared memory (116). When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring the NIC (102) to utilize the high performance media access control chipset (108) for data communications operations may be carried out by setting the active flag for the high performance media access control chipset (108) to a value of '1' and also setting the active flag for the low performance media access control chipset (118) to a value of '0'.

The NIC control module (302) of FIG. 1 may also include computer program instructions that, when executed, configures the NIC (102) to utilize the low performance media access control chipset (118) for data communications operations. Configuring the NIC (102) to utilize the low performance media access control chipset (118) for data communications operations can include powering down the high performance media access control chipset (108). Configuring the NIC (102) to utilize the low performance media access control chipset (118) for data communications operations is carried out in response to determining that the amount of network traffic being processed by the NIC (102) does not exceed the predetermined threshold.

Configuring the NIC (102) to utilize the low performance media access control chipset (118) for data communications operations may be carried out, for example, through the use of an active flag maintained by each media access control chipset in shared memory (116). When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring the NIC (102) to utilize the low performance media access control chipset (118) for data communications operations may be carried out by setting the active flag for the low performance media access control chipset (118) to a value of '1' and also setting the active flag for the high performance media access control chipset (108) to a value of '0'.

The NIC control module (302) of FIG. 1 may also include computer program instructions that, when executed during initial power up of the NIC (102), configure the NIC (102) to utilize the low performance media access control chipset (118) for data communications operations. The NIC (102) of FIG. 1 may initially be configured to utilize the low performance media access control chipset (118) for data communications operations in order to conserve power when the NIC (102) is initially powered up. As the amount of network traffic processed by the NIC (102) increases, however, the NIC may eventually switch modes such that the high performance media access control chipset (108) is utilized for data communications operations.

Figure 2:
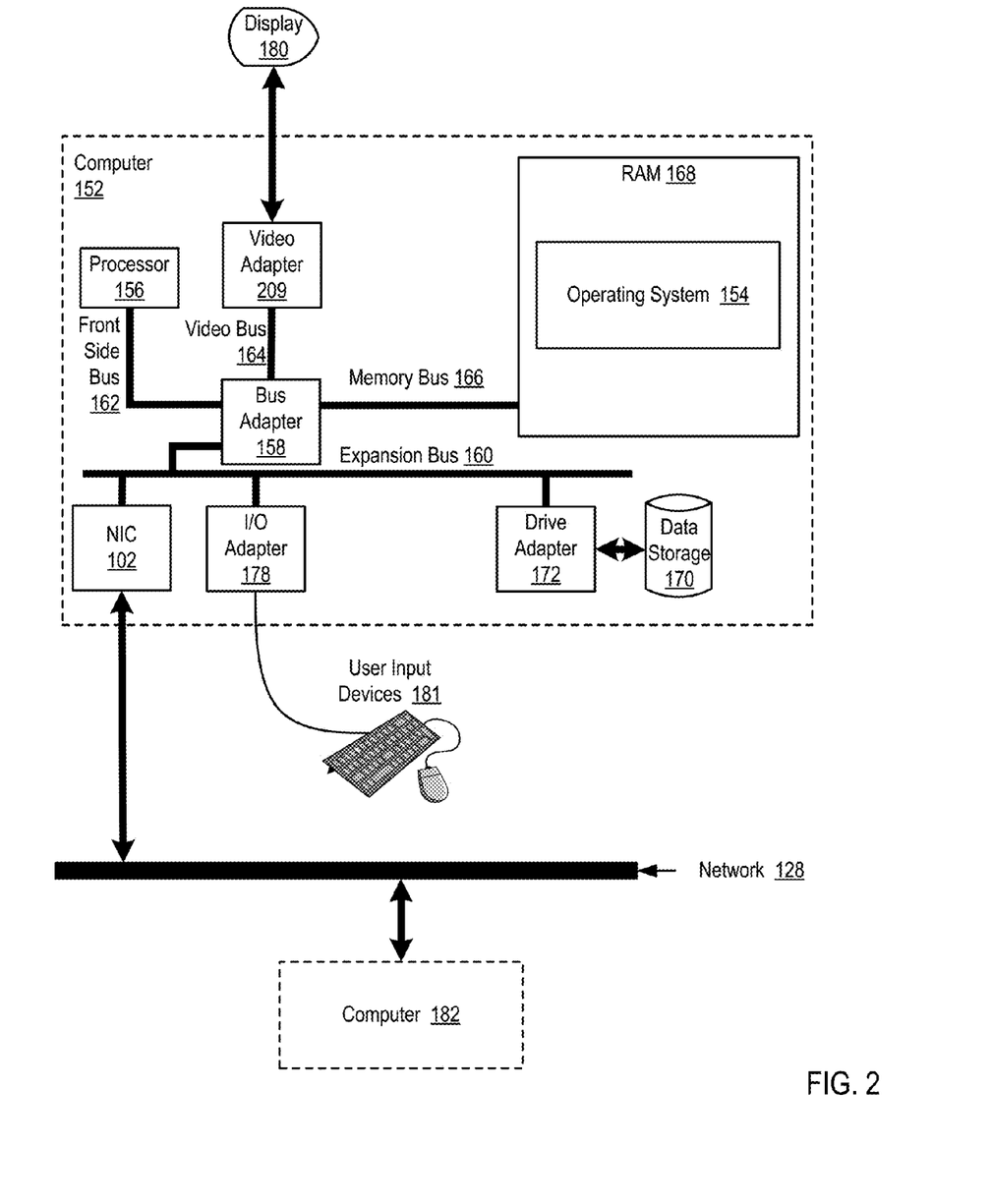
FIG. 2 sets forth a block diagram of automated computing machinery comprising an example computer that may include a dual chipset NIC according to embodiments of the present invention.

FIG. 2 sets forth a block diagram of automated computing machinery comprising an example computer (152) that may include a dual chipset NIC (102) according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an operating system (154). Operating systems useful in computers (152) that include a dual chipset NIC (102) according to embodiments of the present invention include UNIX™, Linux™, Microsoft XP™, AIX™, IBM's i5/OS™, and others as will occur to those of skill in the art. The operating system (154) in the example of FIG. 2 is shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers (152) that include a dual chipset NIC (102) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 2 includes a dual chipset NIC (102) for data communications with other computers (182) and for data communications with a data communications network (128). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of a dual chipset NIC (102) according to embodiments of the present invention include, Fibre-Channel adapters, Ethernet (IEEE 802.3) adapters for wired data communications network communications, 802.11 adapters for wireless data communications network communications, and so on.

Figure 3:
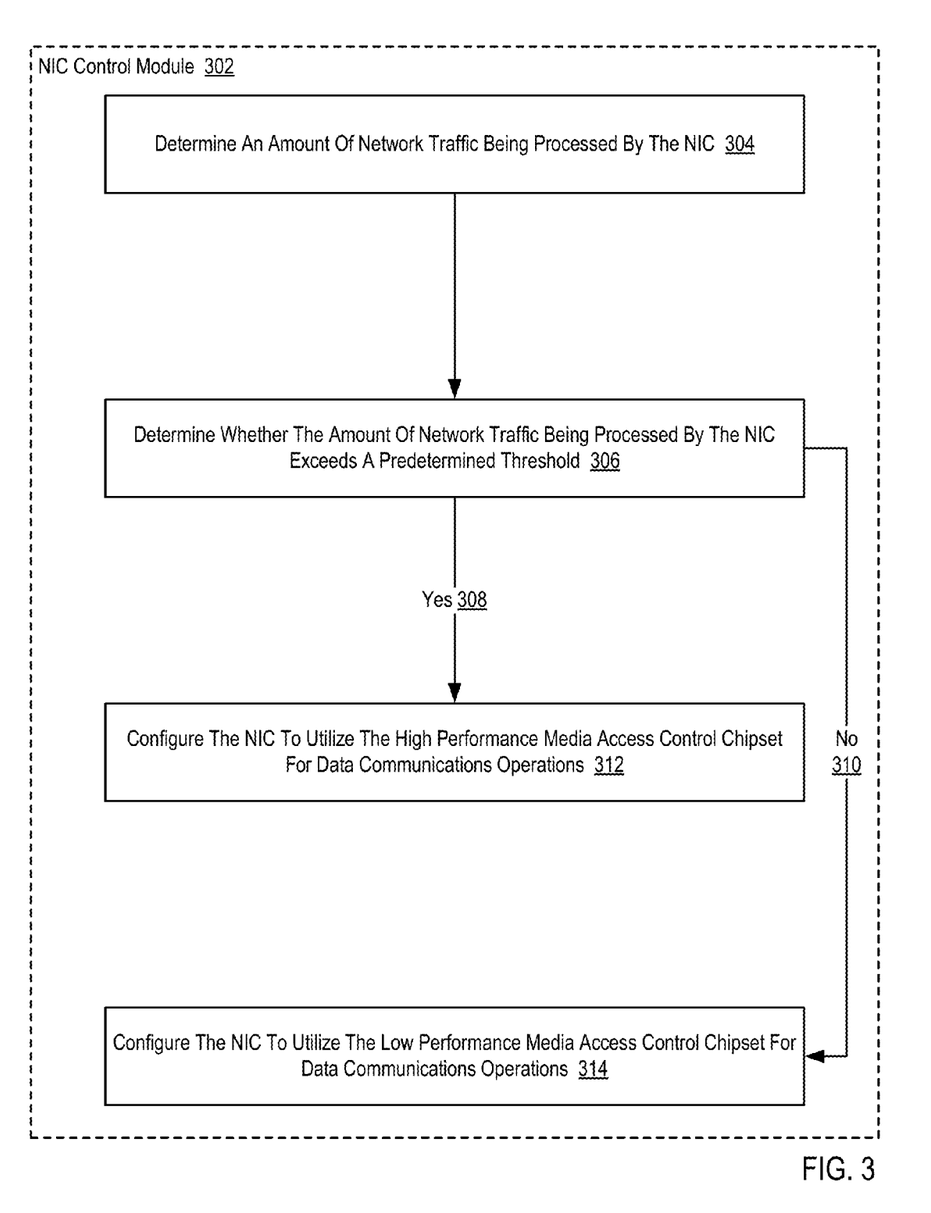
FIG. 3 sets forth a flow chart illustrating an example method for operating a dual chipset NIC that includes a high performance media access control chipset and a low performance media access control chipset according to embodiments of the present invention.

For further explanation, FIG. 3 sets forth a flow chart illustrating an example method for operating a dual chipset NIC that includes a high performance media access control chipset and a low performance media access control chipset according to embodiments of the present invention. In the example method of FIG. 3, the dual chipset NIC that includes a high performance media access control chipset and a low performance media access control chipset may be embodied, for example, as the NIC of FIG. 1.

The example method of FIG. 3 may be carried out by a NIC control module (302). The NIC control module (302) of FIG. 3 may be embodied, for example, as a module of computer program instructions executing on computer hardware such as a computer processor. The NIC control module (302) of FIG. 3 may be stored in computer memory that is included as part of the NIC, such that the NIC itself is responsible for its own operation. For example, the NIC control module (302) of FIG. 3 may be stored in the shared memory (116 of FIG. 1) depicted in FIG. 1 and may be executed by either processor (114 or 126 of FIG. 1) depicted in FIG. 1. Alternatively, the NIC control module (302) of FIG. 3 may be executed by a dedicated, special purpose processor of the NIC that is not illustrated in FIG. 1.

The example method of FIG. 3 includes determining (304), by the NIC control module (302), an amount of network traffic being processed by the NIC. In the example method of FIG. 3, the amount of network traffic being processed by the NIC may be expressed, for example, in terms of the number of bytes processed by the NIC over a particular unit of time. The amount of network traffic being processed by the NIC can include the number of bytes of data received by the NIC, the number of bytes of data transferred by the NIC, or any combination thereof. In such a way, the amount network traffic being processed by the NIC can represent the total amount of data flowing through the NIC over a particular period of time. In the example method of FIG. 3, determining (304) an amount of network traffic being processed by the NIC may be carried out, for example, by monitoring the amount of data flowing out of an egress port of the NIC over a predetermined period of time, by monitoring the amount of data flowing into an ingress port of the NIC over a predetermined period of time, or any combination thereof.

The example method of FIG. 3 also includes determining (306), by the NIC control module (302), whether the amount of network traffic being processed by the NIC exceeds a predetermined threshold. In the example method of FIG. 3, the predetermined threshold represents a point at which the media access control chipset that is best equipped to handle the amount of network traffic that is being processed by the NIC changes. For example, when the amount of network traffic that is being processed by the NIC is lower than the predetermined threshold, data communications operations should be carried out using the low performance media access control chipset. Alternatively, when the amount of network traffic that is being processed by the NIC is greater than the predetermined threshold, data communications operations should be carried out using the high performance media access control chipset. As such, the predetermined threshold may be set to a value representing the maximum amount of network traffic that can be processed by the NIC using the low performance media access control chipset. Determining (306) whether the amount of network traffic being processed by the NIC exceeds a predetermined threshold may therefore be carried out by comparing the amount of network traffic being processed by the NIC to the predetermined threshold.

The example method of FIG. 3 also includes configuring (312) the NIC to utilize the high performance media access control chipset for data communications operations. In the example method of FIG. 3, configuring (312) the NIC to utilize the high performance media access control chipset for data communications operations is carried out in response to affirmatively (308) determining that the amount of network traffic being processed by the NIC exceeds a predetermined threshold. Configuring (312) the NIC to utilize the high performance media access control chipset for data communications operations may be carried out, for example, through the use of an active flag maintained by each media access control chipset. When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring (312) the NIC to utilize the high performance media access control chipset for data communications operations may be carried out by setting the active flag for the high performance media access control chipset to a value of '1' and also setting the active flag for the low performance media access control chipset to a value of '0'.

The example method of FIG. 3 also includes configuring (314) the NIC to utilize the low performance media access control chipset for data communications operations. In the example method of FIG. 3, configuring (314) the NIC to utilize the low performance media access control chipset for data communications operations is carried out in response to determining that the amount of network traffic being processed by the NIC does not (310) exceed the predetermined threshold. Configuring (314) the NIC to utilize the low performance media access control chipset for data communications operations may be carried out, for example, through the use of an active flag maintained by each media access control chipset. When the value of the active flag maintained by a particular media access control chipset is set to '1', the media access control chipset may operate as normal—sending packets and processing received packets. When the value of the active flag maintained by a particular media access control chipset is set to '0', however, the media access control chipset may operate in a standby mode and may be configured to refrain from processing received packets, transmitting packets, or performing any other operations in an attempt to facilitate data communications. In such an example, configuring (314) the NIC to utilize the low performance media access control chipset for data communications operations may be carried out by setting the active flag for the low performance media access control chipset to a value of '1' and also setting the active flag for the high performance media access control chipset to a value of '0'.

Figure 4:
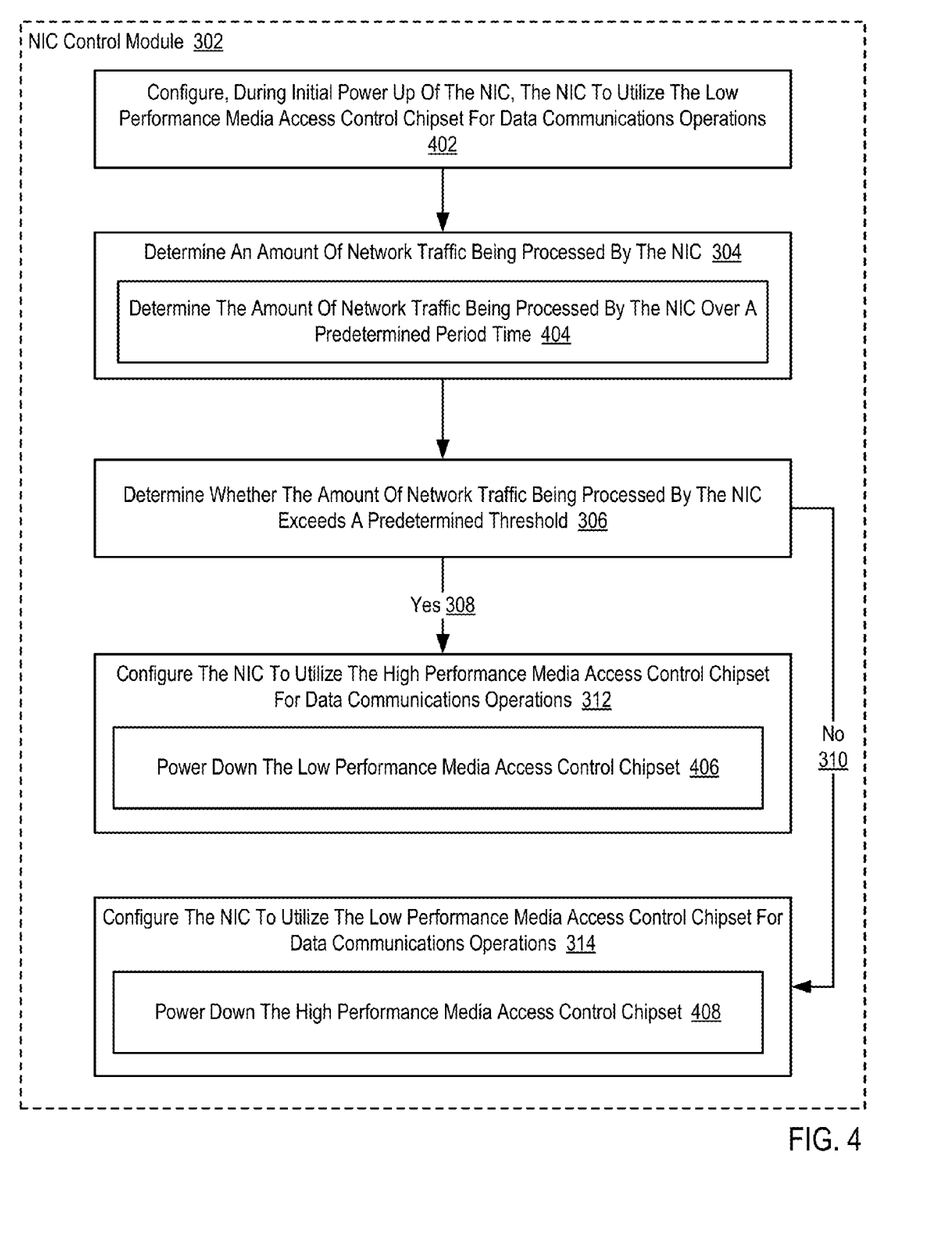
FIG. 4 sets forth a flow chart illustrating an additional example method for operating a dual chipset NIC that includes a high performance media access control chipset and a low performance media access control chipset according to embodiments of the present invention.

For further explanation, FIG. 4 sets forth a flow chart illustrating an example method for operating a dual chipset NIC that includes a high performance media access control chipset and a low performance media access control chipset according to embodiments of the present invention. The example method of FIG. 4 is similar to the example method of FIG. 3, as it also includes determining (304) an amount of network traffic being processed by the NIC, determining (306) whether the amount of network traffic being processed by the NIC exceeds a predetermined threshold, configuring (312) the NIC to utilize the high performance media access control chipset for data communications operations, and configuring (314) the NIC to utilize the low performance media access control chipset for data communications operations.

The example method of FIG. 4 also includes configuring (402), by the NIC control module (302) during initial power up of the NIC, the NIC to utilize the low performance media access control chipset for data communications operations. In the example method of FIG. 4, the NIC may initially be configured to utilize the low performance media access control chipset for data communications operations in order to conserve power when the NIC is initially powered up. As the amount of network traffic processed by the NIC increases, however, the NIC may eventually switch modes such that the high performance media access control chipset is utilized for data communications operations.

In the example method of FIG. 4, determining (304) the amount of network traffic being processed by the NIC includes determining (404) the amount of network traffic being processed by the NIC over a predetermined period time. In the example method of FIG. 4, the predetermined period time may be set by a system administrator, the predetermined period time may be set by the manufacturer of the NIC, and so on. In such a way, the predetermined period time may be set to a value so as to prevent the low performance media access control chipset from handling data communications during an extended high bandwidth period and to also prevent the high performance media access control chipset from handling data communications during an extended low bandwidth period.

In the example method of FIG. 4, configuring (312) the NIC to utilize the high performance media access control chipset for data communications operations includes powering (406) down the low performance media access control chipset. In a similar manner, configuring (314) the NIC to utilize the low performance media access control chipset for data communications operations includes powering (408) down the high performance media access control chipset. In the example method of FIG. 4, powering (406, 408) down a media access control chipset may be carried out, for example, by placing the appropriate media access control chipset into a standby mode, by causing power to not be delivered to the appropriate media access control chipset, and so on.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a dual chipset network interface controller ('NIC') that includes a high performance media access control chipset including at least one processor and an offload engine for processing of an entire protocol stack and a low performance media access control chipset including at least one processor, wherein the at least one processor of the high performance media access control chipset executes computer program instructions at a faster rate than the at least one processor of the low performance media access control chipset, the method comprising:

determining, by a NIC control module, an amount of network traffic being processed by the NIC;

determining, by the NIC control module, whether the amount of network traffic being processed by the NIC exceeds a predetermined threshold;

responsive to determining that the amount of network traffic being processed by the NIC exceeds a predetermined threshold, configuring, by the NIC control module, the NIC to utilize the high performance media access control chipset for data communications operations; and responsive to determining that the amount of network traffic being processed by the NIC does not exceed the predetermined threshold, configuring, by the NIC control module, the NIC to utilize the low performance media access control chipset for data communications operations.

2. The method of claim 1 further comprising configuring, by the NIC control module during initial power up of the NIC, the NIC to utilize the low performance media access control chipset for data communications operations.

3. The method of claim 1 wherein determining the amount of network traffic being processed by the NIC further comprises determining the amount of network traffic being processed by the NIC over a predetermined period time, the predetermined period time set to a value so as to prevent the low performance media access control chipset from handling data communications during an extended high bandwidth period and to prevent the high performance media access control chipset from handling data communications during an extended low bandwidth period.

4. The method of claim 1 wherein configuring the NIC to utilize the high performance media access control chipset for data communications operations further comprises powering down the low performance media access control chipset.

5. The method of claim 1 wherein configuring the NIC to utilize the low performance media access control chipset for data communications operations further comprises powering down the high performance media access control chipset.

6. The method of claim 1 wherein the NIC includes shared memory accessible by the high performance media access control chipset and the low performance media access control chipset.

7. The method of claim 1 wherein the high performance media access control chipset includes an offload engine and the low performance media access control chipset does not include an offload engine.

* * * * *